United States Patent [19]

Bennick, Jr.

[11] 4,016,676
[45] Apr. 12, 1977

[54] PLANTER AND METHOD OF MAKING SAME

[76] Inventor: Edward T. Bennick, Jr., Rte. 3, Box 683, Lincolnton, N.C. 28092

[22] Filed: Mar. 12, 1976

[21] Appl. No.: 666,465

[52] U.S. Cl. .............................. 47/66; 264/45.1; 428/15

[51] Int. Cl.² ........................................ A01G 9/02

[58] Field of Search ............ 428/15; 431/126, 288; 264/46.4, 239, 45.1, 337–338; 47/34, 37; 220/83

[56] References Cited

UNITED STATES PATENTS

| 1,762,082 | 6/1930 | Shiraishi | 47/41 |
| 2,757,841 | 8/1956 | Chapman | 47/37 X |
| 3,373,009 | 3/1968 | Pruitt et al. | 47/37 UX |
| 3,834,072 | 9/1974 | Rack | 47/37 |
| 3,836,619 | 9/1974 | Volent | 428/15 X |

OTHER PUBLICATIONS

Garden Pools, Fountains, & Waterfalls, 1965, Lane Books, Menlo Park, CA, pp. 10, 11, 27.

Primary Examiner—Robert E. Bagwill
Attorney, Agent, or Firm—Richards, Shefte & Pinckney

[57] ABSTRACT

A planter, and a method of forming the same having the configuration of a lump of earth and having an exterior surface formed of earthen material. The method includes the steps of forming a cavity in a volume of earthen material, maintaining a container in the cavity in spaced relation thereto, introducing a liquid form of rigid cellular polyurethane plastic into the spacing between the cavity and the container and allowing the polyurethane to cure whereby it expands throughout the confines of the spacing while adhering to the container and to a thin layer of the earthen material which forms the exterior surface of the planter. The top surface of the planter may also be coated with the liquid polyurethane and then pressed against a corresponding area of earthen material whereby the top surface of the planter will also consist of a thin layer of earthen material.

10 Claims, 9 Drawing Figures

PLANTER AND METHOD OF MAKING SAME

BACKGROUND OF THE INVENTION

Although plants and the like have traditionally been placed in conventional flower pots made of fired clay and usually having a generally conical shape with a flat bottom surface, it is becoming increasingly more popular to place plants, particularly house plants, in more decorative planters having a wide range of shapes, colors, and configurations, and made from a variety of materials such as plastic, glass and ceramic materials.

Since the natural habitat of plants is earth, planters are frequently designed specifically to simulate this natural habitate so the planter lends itself to providing a general impression of an outer environment for the plant that is disposed therein. For example, it is known to produce planters which have the general appearance of a true trunk, such planters generally being formed of plastic that is molded to provide a roughened exterior surface configuration simulating that of an actual tree trunk, and is then painted with an appropriate coloring. Other planters have also heretofore been made which have the exterior surface thereof painted or otherwise decorated with artificial materials to simulate the appearance of earth.

However, while such known planters have generally pleasing aesthetic characteristics, they nevertheless suffer the burden of being readily identified as simulations.

By substantial contrast, the present invention discloses a method of forming a planter that is precisely identical in surface configuration and makeup to a lump of earth, and that is light and durable.

SUMMARY OF THE INVENTION

In accordance with the present invention, a method is provided for forming a unique planter having the general appearance of a piece of earth, such method including the steps of forming a cavity, preferably of irregular shape, in a volume of earthen material, then placing a suitable container within such cavity in spaced relation to the sides of the cavity, and then introducing a filler material within the spacing between the container and the sides of the cavity. This filler material adheres to the container, fills the spacing in the cavity to conform to the surface configuration thereof, and adheres to a thin layer of earthen material located along the entire surface contour of the cavity. The container, with the filler material and layer of earthen material adhering thereto, is then removed from the volume of earthen material to produce a planter having an opening formed by the container in which a plant may be placed, and having the sides and bottom surfaces thereof covered with a thin layer of actual earthen material whereby the planter appears to be a "plug" taken directly from the earth.

Preferably, the filler material is a polyurethane plastic material which can be introduced into the cavity in liquid form and then allowed to expand, as it cures, throughout the spacing between the container and the cavity. After the polyurethane is fully cured, it forms a rigid but lightweight open cellular matrix that conforms faithfully to the contour of the cavity while adhering to the container and the earthen material as described above.

If desired, the top surface of the molded planter, formed as indicated above, may be coated with the polyurethane material in liquid form, and the top surface of the planter is then pressed against a corresponding area of earthen material to cause a thin layer of the earthen material to adhere to the top surface of the planter whereby the entire exterior surface of the planter is covered with a thin layer of earthen material.

Alternatively, the top surface of the molded planter may be formed with a thin layer of earthen material by supporting a sheet of porous material across the top of the cavity after the container is disposed therein and prior to expansion of the filler material, and then placing a quantity of loose earthen material on the porous sheet to be supported thereby. When the filler material expands, it will pass through the porous sheet and adhere to the earthen material supported thereby, whereby the top surface of the molded planter will also be covered with a thin layer of earthen material.

DESCRIPTION OF THE PREFERRED EMBODIMENT

Figure 1:
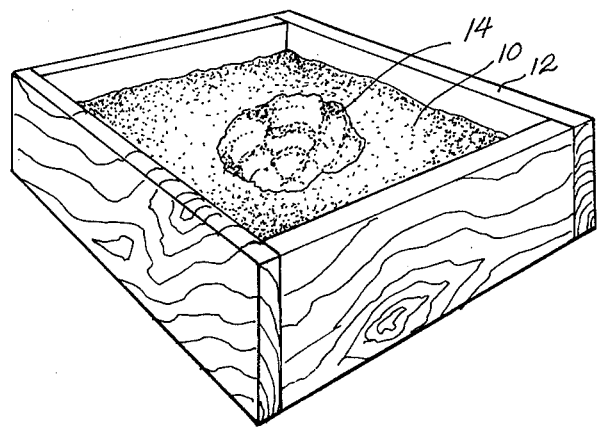
FIG. 1 is a perspective view of a volume of earthen material arranged in a box and having a cavity formed therein.
Figure 2:
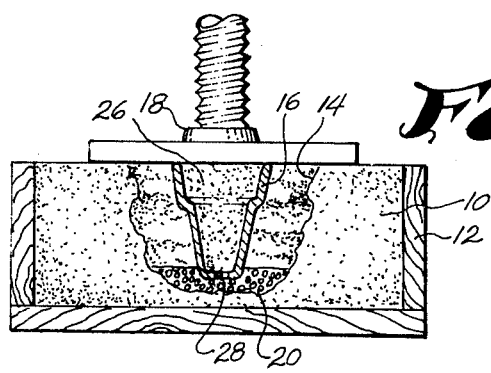
FIG. 2 is a side elevation view of the box of earthen material shown in FIG. 1 with a container held in place in the cavity and with a quantity of filler material introduced into the cavity.
Figure 3:
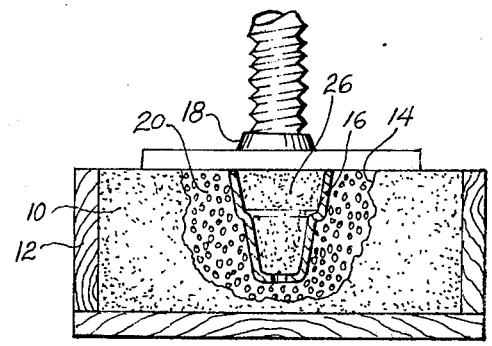
FIG. 3 is a side elevation view similar to FIG. 2 and illustrating the filler material in its expanded condition.

In the preferred embodiment of the present invention, a volume of earthen material 10 is provided, such volume of earthen material 10 being preferably contained in a wooden box 12 or the like and having a cavity 14 formed therein as shown in FIG. 1. Next, as shown in FIG. 2, a container 16, which may be a conventional flower pot, is located within the cavity 14 and maintained thereat, as by a conventional screw press 18, and a quantity of filler material 20 is introduced into the spacing between the container 16 and the sides of the cavity 14. The top of the container 16 may be temporarily secured to the abutting surface of the screw press 18 to maintain it in fixed relation to the cavity 14, or if the filler material 20 is a polyurethane material in liquid form, as will be discussed presently, the container 16 may simply be placed into the filler material 20 and pressed thereagainst by the screw press 18 to maintain the container 16 in place therebetween. The filler material 20 is then allowed to cure, and as it does so it expands throughout the spacing the container 16 and the sides of the cavity 14 until such spacing is filled as shown in FIG. 3, the container 16 being held in place by the screw press 18 during such expansion. It may be desirable to pack the interior of the container 16 with a sand or similar packing 26 to prevent the filler material from expanding into the interior of the container 16, as for example through bottom opening 28 usually found in conventional flower pots. Such packing 26 would, of course, be removed after the planter is formed.

The filler material 20, in addition to filling the spacing between the container 16 and the cavity 14 so as to conform to the surface configuration of the cavity 14, also adheres to the exterior sides of the container 15 and adheres to a thin layer of the earthen material along the entire surface of the cavity 14. Accordingly, when the screw press 18 is released and the container 16 is removed from the cavity 14, a planter 22 is formed, like that shown in FIG. 4, with all of the exterior side and bottom portions thereof having a configuration substantially identical to that of the original cavity 14 and having a crustlike thin coating consisting of the actual earthen material 10 defining the original cavity 14. It will be readily appreciated that the sides and bottom of the planter 22 have the same shape and surface appearance as would a lump of earth removed from the earthen material 10 to form the cavity 14.

Figure 4:
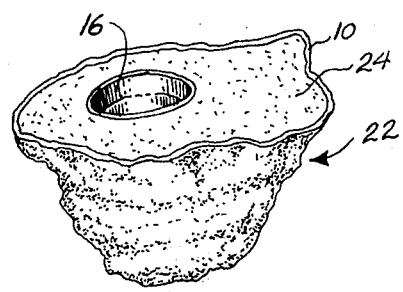
FIG. 4 is a perspective view of the planter after it has been removed from the volume of earthen material shown in FIG. 3.
Figure 5:
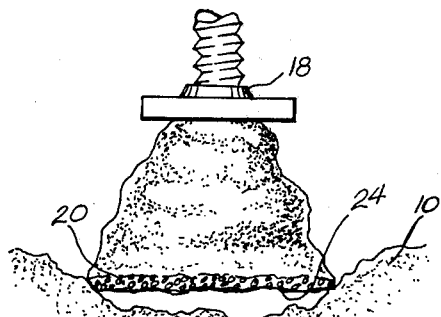
FIG. 5 is a side elevation view of the planter with the top surface thereof coated with the filler material and pressed against an area of earthen material.
Figure 6:
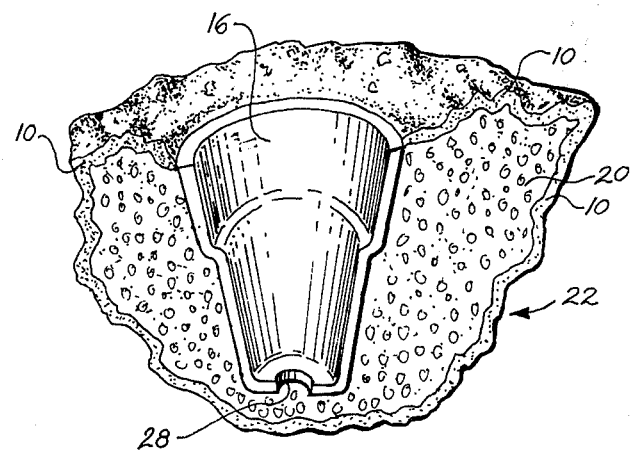
FIG. 6 is a sectional view of a planter formed in accordance with one embodiment of the present invention.

The planter 22 may be used in the form shown in FIG. 4, or, if it is desired to also provide the top surface 24 thereof with an earthen material covering, the top surface 24 may be pressed against a corresponding area of earthen material 10 with a small quantity of filler material 20 disposed therebetween, as shown in FIG. 5. The filler material 20 may be poured onto the earthen material 10 in the manner previously described, but because the spacing between the top surface 24 and the earthen material 10 is relatively small in volume, it is generally preferable to simply coat the top surface 24 with a layer of filler material 20 and maintain the inverted planter 22 in place against the earthen material 10 as illustrated in FIG. 5, whereby the filler material 20 will fill such spacing and adhere both to the top surface 24 and to a thin layer of the earthen material 10. As a result, the planter 22 has the entire exterior surface thereof covered with a thin layer of earthen material as illustrated in FIG. 6.

Figure 7:
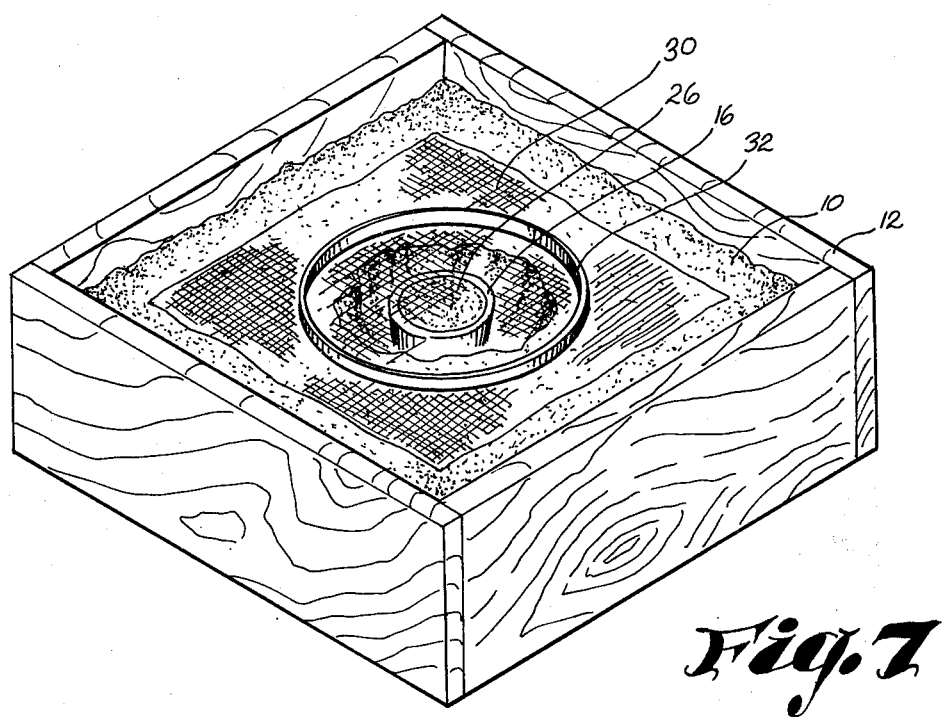
FIG. 7 realtes to an alternative embodiment of the present invention and illustrates a perspective view similar to FIG. 1, showing the use of a sheet of porous material extending across the top of the cavity formed in the earthen material.
Figure 8:
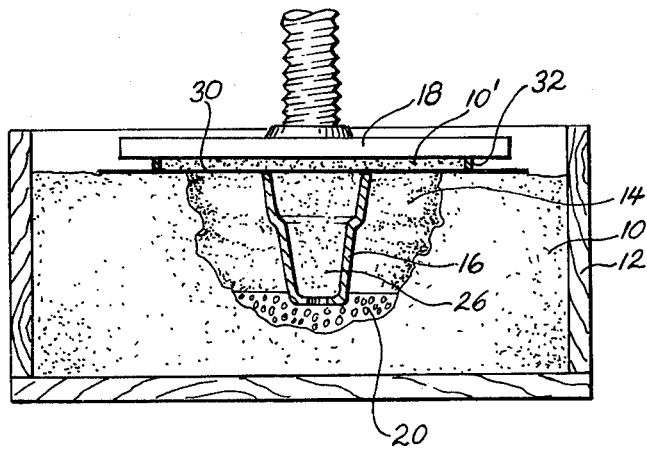
FIG. 8 is a side elevation view of the alternate embodiment of the present invention illustrated in FIG. 7.
Figure 9:
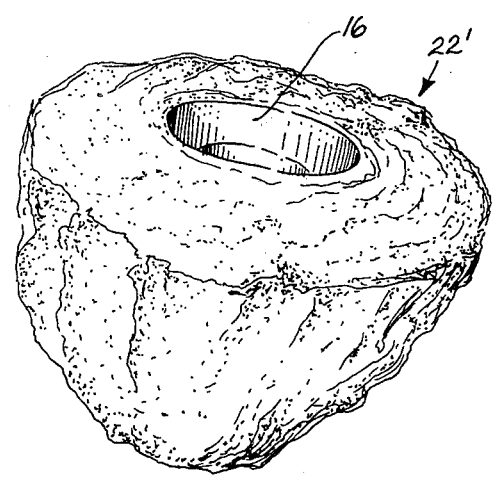
FIG. 9 is a perspective view of a planter formed in accordance with the alternate embodiment of the present invention.

An alternative and generally preferred method of providing the top surface of the planter 22 with a covering of earthen material is illustrated in FIGS. 7, 8 and 9 wherein parts which are identical to those shown in FIGS. 1–6 have the same reference numeral. As best seen in FIGS. 7 and 8, a thin sheet 30 of porous material is placed over the top of cavity 14 after the container 16 and uncured filler material 20 have been placed therein, and a thing ring member 32 is then placed on the top of the sheet 30 so as to be supported by the top surface of the earthen material 10 beyond the peripheral boundaries of the cavity 14, whereby the ring member 32 will act to hold the sheet 30 tautly across the top of the cavity 14. A relatively small quantity of loose or sifted earthen material 10' is then placed on the sheet 30 for support thereby within the confines of the ring member 32. The screw press 18 is then pressed against the ring member 32 as illustrated in FIG. 8, and the filler material 20 is permitted to expand throughout the cavity 14 as previously described. As the filler material 20 expands, it will also flow across the top of the sand 14 in the container 16, and will pass through the porous openings in the sheet 30 to contact and adhere to the earthen material 10' supported on the sheet 30. When the filler material 20 is fully cured, the portion of the sheet 30 at the top of the container 16 will be completely covered by the earthen material adhering to the filler material 20 thereat so that it will be invisible. The remaining part of the sheet 30 may then be trimmed, preferably by burning, and a hole conforming to the top opening in the container 16 may be cut or otherwise formed in the planter 22' to provide a finished product as illustrated in FIG. 9 which has the entire exterior surface thereof covered with a thin layer of earthen material.

The aforementioned sheet 30 preferably consists of nylon netting, such as tulle, which has a sufficiently fine mesh to support most types of natural earthen material, and which will nevertheless permit the expanding filler material 20 to pass through the small openings in the netting and adhere to the earthen material supported thereby.

It has been found that exceptionally good results are obtained if a rigid polyurethane foam cellular plastic material is used as the filler material, such as Vultafoam (formulation 16-F-1904) sold by General Latex and Chemical Corporation. This polyurethane foam cellular plastic material is formed by mixing in equal proportion two liquid components, a resin component and an isocyanate component, and allowing the mixture to cure and expand into a rigid open cellular foamed material. Thus, the components may be stored separately, and, when needed, a measured quantity of components may be mixed and immediately introduced into the spacing between the container 16 and the cavity 14. The mixture then cures, and as it does so, it expands throughout such spacing, all as described above. It will be appreciated that the quantity of the mixture required, will depend upon the volume of the spacing between container 16 and the cavity 14 and the curing time will depend upon the type of filler material used. Once the mixture is fully cured, it forms an extremely lightweight yet durable filler than adheres to the exterior walls of the container 16 and to a thin layer of earthen material 10, thereby providing the planter with the same appearance as a lump of earth, yet the planter is lighter in weight and considerably more stable than a lump of earth. Additionally, the relatively thick layer of rigid open cellular foamed material formed about the container 16 provides an excellent insulation layer for the water and plants which are placed in the planter 22, and, as a result, there is substantially less evaporation of the water whereby frequency at which the plant in the planter 22 must be watered is significantly reduced.

It will be appreciated that the earthen material 10 may be of any desirable consistency and makeup. For example, it may consist solely of one type of earth such as sand or clay, or it may be specifically arranged in layers or mixes of a variety of types of earth. Moreover, the earthen material 10 may have small pebbles or pieces of roots and the like interspersed throughout the mixture, and such elements will adhere to the filler material 20 and be presented at the exterior surface of the planter 22 when it is formed. Thus, the earthen material 10 may be a volume of earth removed intact from the ground, or it may be specially formed in an infinite variety of ways using an infinite variety of components and component arrangements, and the exterior surface of the final form of the planter 22 will faithfully reproduce the selected earthen material 10.

The cavity 14 may also have any desired shape or configuration, and, again, this shape or configuragtion will be identically reproduced at the exterior surfaces of the planter 22. Preferably, the cavity 14 has a completely irregular configuration so that the planter 22 will appear as an indiscrete lump of earth that is particularly suitable for a planter.

The container 16 is, as indicated above, preferably a conventional clay fired flower pot, but it is to be understood that the container 16 may take any form which will provide an opening in the planter, as finally formed, in which plants may be placed. Also, while the method of maintaining the container 16 in place during the introduction and expansion of the filler material 20 as described above offers substantial advantages in forming a suitable planter, it is also possible to omit the container 16 and fill the cavity 14 entirely with filler material 20, and, when the filler material 20 solidifies, drill or otherwise form an opening in the filler material 20. If this is done, it may also be desirable to locate a suitable container within the opening after it is formed, or to provide the opening with a lining that renders the sides of the opening watertight.

Additionally, while the planter formed by the present invention is generally quite stable as indicated above, the polyurethane filler material 20 may tend to deteriorate if it is exposed for long periods of time to the ultraviolet rays in sunlight, and it may therefore be desirable to apply a thin film of a conventional transparent acrylic base coating to the entire exterior surface portion of the planter to thereby protect the polyurethane from such ultraviolet rays.

Finally, it is to be noted that the container 16 could also be located in the cavity 14 at an inverted disposition rather than at the upright disposition shown in FIGS. 1 and 3. Thus, if it is desirable to form a planter with a flat bottom surface rather than a flat top surface, the container 16 is first filled with a packing 26 and then maintained at an inverted position within the cavity 14 during introduction and expansion of the filler material. When the container 16 is removed from the cavity 14, the surface of the planter nearest the bottom of the container 16 will be flat, and any excess filler material 20 at the top opening of the container 16 may be cut away or otherwise removed to expose the opening formed by the container 16.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A method of forming a planter having an earthen like exterior surface configuration, said method comprising the steps of:
   a. providing a volume of earthen material;
   b. forming a cavity in said volume of earthen material;
   c. introducing into said cavity a filler material consisting of a quantity of liquid plastic material;
   d. allowing said liquid plastic material to cure by expanding to a rigid cellular form throughout said cavity to conform to the surface configuration thereof while adhering to a thin layer of said earthen material at the wall of said cavity; and
   e. forming an opening in said cured plastic material for receiving a plant.

2. A method of forming a planter as defined in claim 1 and further characterized in that said opening is formed in said filler material by maintaining a container in place in said cavity in spaced relation to the sides of said cavity, and introducing said filler material into said spacing between said cavity sides and said container to fill the same and adhere to the exterior surface portions of said container.

3. A method of forming a planter as defined in claim 2 and further characterized by the step of coating said thin layer of earthen material with a thin film of transparent acrylic base coating for protecting said plastic material after it has been allowed to cure.

4. A method of forming a planter as defined in claim 3 and further characterized by the further steps of applying a layer of said plastic material to the top surface of said container and said cured plastic material adhering thereto, and then pressing said top surfaces against a corresponding area of said earthen material to cause a thin layer of said earthen material to adhere to said top surfaces.

5. A method of forming a planter as defined in claim 2 and further characterized in that said cavity has an irregular surface configuration throughout, and in that the volume of said cavity substantially exceeds the volume of said container.

6. A method of forming a planter as defined in claim 2 and characterized by the further steps of placing a sheet of porous material across the top of said cavity having said container therein, placing a quantity of said earthen material on said sheet of porous material for support thereby, and causing said filler material to pass through said porous sheet to adhere to said earthen material supported thereby.

7. A method of forming a planter as defined in claim 6 and characterized by the further steps of causing said porous sheet to extend beyond the periphery of the top of said cavity, locating a ring member on top of said porous sheet so as to be supported by the upper surface of said volume of earthen material, and pressing said ring members against said volume of earthen material to hold said porous sheet taut across said cavity.

8. A planter for holding flowers, plants and the like, said planter comprising a body portion including a mass of rigid expanded cellular plastic material, said boby portion having a configuration corresponding generally to a lump of earth and having an opening formed therein, and said body portion adhering to a layer of earthen material covering substantially the entire exterior surfaces thereof.

9. A planter as defined in claim 8 and further characterized in that said opening in said body portion is formed by a container, and in that said mass of rigid cellular plastic material is disposed about the exterior surface of said container and adheres thereto.

10. A planter as defined in claim 8 and further characterized in that said layer of earthen material is coated with a thin film of a transparent acrylic base coating for protecting said mass of rigid cellular plastic material.

* * * * *